Sept. 30, 1941.  H. F. S. VON BURTENBACH  2,257,406
SUPPORTING PLANE FOR HYDROPLANES
Filed April 7, 1937  2 Sheets-Sheet 1
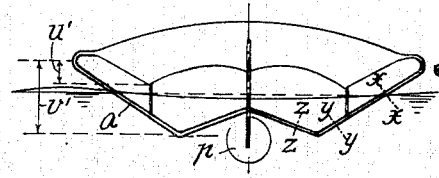
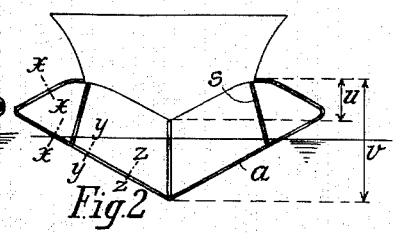
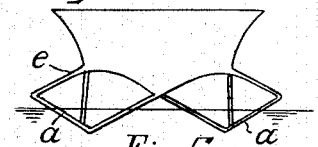
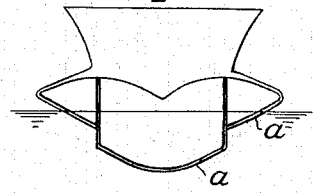
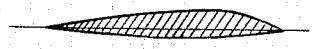
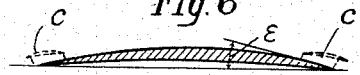
Inventor
Hanns F. S. von Burtenbach
By Sommers & Young
attys

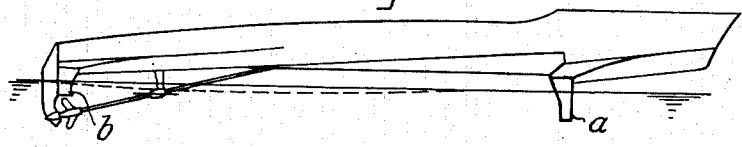
Fig. 10
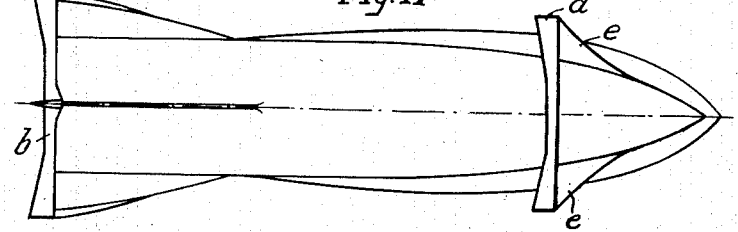
Fig. 11
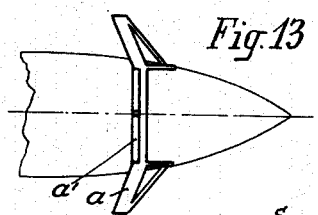
Fig. 13
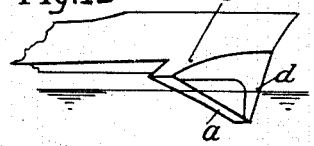
Fig. 12
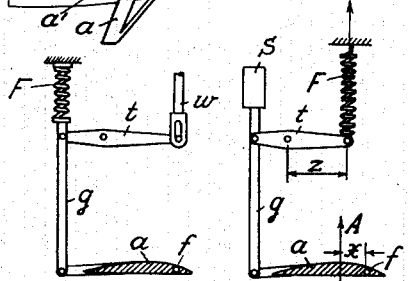
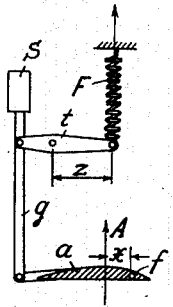
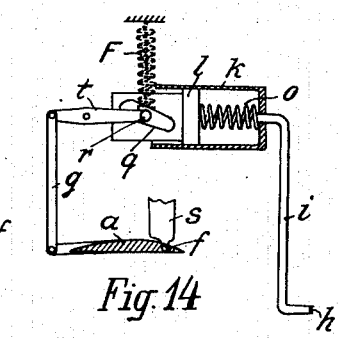
Fig. 16   Fig. 15   Fig. 14
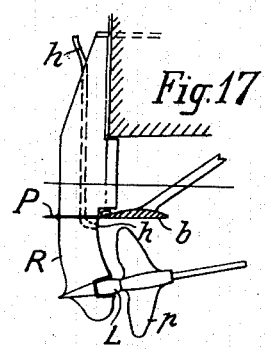
Fig. 17
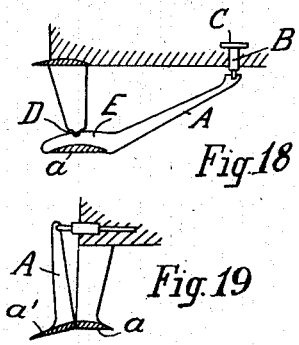
Fig. 18
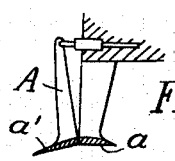
Fig. 19
Inventor
Hanns F. S. von Burtenbach
By Sommers & Young Attys Patented Sept. 30, 1941

2,257,406

UNITED STATES PATENT OFFICE 2,257,406

SUPPORTING PLANE FOR HYDROPLANES

Hanns Freiherr Schertel von Burtenbach, Wiesbaden, Germany

Application April 7, 1937, Serial No. 135,593
In Germany August 1, 1934

1 Claim. (Cl. 114—66.5)

The present invention relates to supporting planes for hydroplanes, more particularly to supporting planes of a curved form, arranged in tandem order and inclined in the transverse direction, so that they are partly immersed in the water and partly extend from the water. For the purposes of this specification, three portions of the supporting planes are distinguished as follows:

1. The portions which are normally entirely submerged in the water, hereinafter called the "submerged portions,"
2. The portions which are normally emerged above the water level, hereinafter called the "emerged portions," and
3. The portions between these submerged and emerged portions hereinafter called the "portions near the water level." The invention relates to the shapes of these planes depending on their position in relation to the water level, in relation also to the hull of the boat, with regard to protection from floating timber and with regard to the driving propeller, and more particularly to the shape of the portions of the planes near the water level. It relates also to the control or adjustment of the said planes.

With regard to supporting planes for water craft, which have portions arranged at varying distances below and above the water surface, it was not known hitherto and it has not been recognized that the submerged portions thereof are subject to entirely different hydrodynamic conditions than the supporting plane portions near the water surface or the emerged portions. Up to the present, all portions of the supporting planes have been designed substantially on identical lines. Neither was it known nor recognized that the forward supporting planes are subject to quite different conditions than the rearward supporting planes, and that the rearward supporting planes and also the propellers at the rear of the ship are in the stream disturbed by the forward supporting plane and may, therefore, be liable to a deterioration of their lift-drag ratio and efficiency.

Considering the supporting plane portions arranged at different heights with respect to the water level, the plane portions submerged at greater depths (about twice the depth of the planes), operate as supporting planes submerged entirely in a homogeneous medium and are subject to the same laws as the supporting planes known in aerodynamics, if the cavitation phenomena produced at high speeds be neglected, with the portions of the supporting planes near the water surface, the underpressure area or suction on the upper surface of the plane is reduced and the distribution of pressure over the depth of the plane is changed. As the distance from the water surface decreases, the danger of air entering into the underpressure area on the suction side of the supporting plane increases thus resulting in a great loss of lifting effect. In particular at the plane portions near the water level the flow of the water-stream tends to separate or "peel off" from the upper plane surface and to be deflected upwards by the front edge, so that a negative lift will result at this point. The greatest difficulties were experienced, with supporting planes of hydroplanes, on the water surface. Therefore, means are provided for forcing the stream to hug the plane surface at this point and for maintaining it there in a stable condition in order to assure the stability of the water craft itself.

My water supporting planes, therefore, have a shape, profile and incidence angle changing with the position of the respective portions of the supporting planes with respect to the water surface.

The plane portions positioned at greater depth, which remain permanently in a submerged position even in the case of undulatory motion of the water and which merely represent the supporting portions, are made with the supporting plane profiles well known in aerodynamics with an upper side producing considerable suction and with an essentially convex underside. The convex underside results in a small profile resistance and in a great moment of static resistance, whereby, in consequence of an increased strength of the plane, the number of the hydrodynamically disadvantageous stays may be reduced. In this connection (apart from very speedy crafts) an incidence angle may be provided which assures the best lift-drag ratio (resistance per lifting force).

The portions of the plane which are positioned near the surface and are submerged into and lifted out of the water, by oscillations or changes of speed of the water vehicle, and form the stabilizing or controlling part of the plane, are constructed as to shape, profile and transverse inclination to the water surface in such a manner that a stability of flow is obtained which is not destroyed or affected by the atmosphere. They are given a profile which assures a great overpressure on the underside (said overpressure being independent from the atmosphere), a small, uniformly distributed underpressure or suction on the upperside, and, with a slight deviation of the flow or stream by the forward edge, a quickly hugging flow at the upperside.

This profile has, for example, a concave underside, a slightly convex upperside approaching the form of a circular arc, with the maximum height of the profile near the middle, with a sharp forward edge angle not exceeding 20° between upperside and profile chord. The thickness of the profile should not exceed 1/15 of the profile depth. The incidence angle is kept small, i. e. about 2°.

In order to force the stream to hug the upperside, saw-shaped indentations may be provided, which at the same time minimize friction, or auxiliary planes above the upperside which are adapted to prevent the flow from peeling off from the upper plane surface. These auxiliary planes may be positioned near the front edge of the planes, thus forming together with the front edge, a nozzle-shaped slot adapted to impart an acceleration to the water and to direct it tangentially to the upperside. Again, according to another modification, the supporting planes themselves may have slots transversely or perpendicularly to the travelling direction of the craft which are reduced in cross-section towards the upper side and adapted to produce an accelerated stream of water from the underside to the upperside. The slots may be so designed that a suction effect is produced at the underside. Covering surfaces or baffles arranged perpendicularly to the upperside will prevent the air sucked-in incidentally from advancing in a detrimental manner.

In order to prevent further the inrush of air, and to stabilize the stream of the portions of the planes near the water lever, these portions are considerably inclined in a transverse direction. This transverse inclination will be from 25–30°, whereas the submerged portions not rising over the water are given any or no inclination at all.

The submerged portions pass over to the rising portions near the water lever through an intermediate profile with a straight underside. In order to increase the stabilizing effect and the strength of the plane portions near the water level, it is preferable to make the depth of their surface, i. e. their extent in the travelling direction larger than in the submerged portions.

In a boat hull provided with gliding planes on the bottom, the ends of the emerged plane portions are preferably made to pass over to the gliding planes or fin-shaped flaring portions of same, which may also be in the form of a supporting plane, in a gradual and even way in such manner that the lifting effect of the supporting planes is continued uninterruptedly in the gliding planes. If steps are provided at the boat hull, the supporting planes are shaped so as to pass over to the gliding planes near the steps.

In order to prevent the submerged supporting plane portions from emerging out of the water level in high waves, they may be placed, separate from the portions near the water level, at considerably greater depths below the water surface, being connected to the other portions by means of stays.

By arranging the supporting planes in consecutive or tandem order, problems arise that have not been hitherto known: the forward supporting plane moves in water which is not influenced by the vehicle and is exposed to the full action of the waves. Its lifting force exerts a pressure on the water which produces a downward movement of the water or "downstream" followed at some distance by an upward movement of the water or "upstream," thus forming a trough or depression. The length of the trough depends on the lift coefficient of the supporting plane and on the travelling speed. The width of the trough increases towards the rear in the case of supporting planes of V- or U-shape or angle-shaped or curved form, which produce an outwardly directed pressure component.

The forward plane accordingly meets the full force of the wave and is principally exposed to injury by floating objects. The rear supporting planes as well as the propellers situated at the stern of the ship operate in the water surface deformed by means of the forward planes in the form of a trough. They are to a great extent protected from sunken or floating objects by the forward planes. The rear supporting planes represent a stable system, since their sinking movement produces an increase of the incidence angle and, consequently, of their lifting force, whereas the incidence angle and the lift of the forward supporting planes is reduced in an unstable manner in case of a sinking movement of the forward supporting planes.

Narrow supporting planes having a large width of span and a smaller induced resistance causing only a slight disturbance of the water surface are used in preference. Their mutual distance in the travelling direction is of importance for their lift-drag ratio. If a rearward supporting plane is in the downstream of the trough, its lifting resultant will be inclined towards the rear by the angle formed between the downstream and the horizontal, and the lift-drag ratio will be decreased accordingly. For this reason I provide, for the purpose of obtaining a good lift-drag ratio, a sufficient space between two consecutive supporting planes, so that the rear plane at travelling speed will be in the upstream of the trough, whereby the lifting resultant is given a forward inclination by the angle formed between the upstream of the trough and the horizontal, which results in an improvement of the lift-drag ratio.

My novel supporting planes are designed in different ways depending on whether their position is at the foreship or stern.

The forward supporting plane, which is struck by the full force of the waves, is given, in the transverse direction, a greater curvature or bend than the rearward supporting plane. Further, the forward supporting plane has a greater maximum depth of submergence and a greater maximum height of emergence above the water level, i. e. a greater range of action vertically. In order to oppose a sufficiently great lifting power to the oscillations produced by the play of the waves at the foreship, the emerged plane portions of the forward supporting plane, corresponding to the emerged reserve displacement in displacement ships, are made larger in relation to the submerged area than the corresponding portions of the rearward planes. Since the forward supporting planes constitute a labile system inasmuch as their sinking causes the entire craft to describe a turning movement around the rearward plane reducing the incidence angle of the forward planes, the emerged supporting plane portion is given, in compensation, an incidence angle increasing with the height of emergence. The incidence angle is so chosen that every plane portion immersing afresh will receive the impact of the stream, notwithstanding the turning movement executed by it, always at the same incidence angle or at an incidence angle increasing with the progressing immersion.

Up to the present, the problems of supporting planes moving consecutively or in tandem order in the waves have not been treated, and in particular the influence of the dimensions of the emerged supporting planes has not been recognized. Only the reverse design, in which the forward plane has been keeled less and in which the draught of the forward plane has been less than that of the rearward plane, has been applied.

Whereas the rearward plane is moving in a subdued range of waves, it is better suited than the forward plane to stabilize the transverse position and is, therefore, given, in a novel manner, a greater width of span than the forward supporting plane. In hydroplanes that are to have a specially great stability around the longitudinal axis, two supporting planes are placed side by side, preferably within the subdued area of the trough emanating from the keeled forward plane and flaring towards the rear.

In order to protect the supporting planes from floating objects, they may be placed, in particular in connection with backwardly slanting stays or stays with slanting protecting rails, in a divergent rearwardly arrangement. It is also possible to provide at the forward edge of the supporting planes slanting protecting rails from which the objects floating against them are deflected and thrown off towards the sides or the plane portions near the water level alone are positioned divergent rearwardly or they may be fitted with rearwardly slanting protecting rails. In most cases it is sufficient to apply these preventive safety measures to the forward planes only, and owing to the stream flaring backward, which carries the floating objects towards the outside, the rearward plane with its wider span is also protected hereby.

The supporting planes described may be attached to craft of any description having hulls of most varying shapes. The effect is at its best, if their lifting forces are assisted by the lifting action of the boat body. The supporting planes are arranged in relation to the boat body in such a way, that the lowest portions of the boat body producing lifting forces are placed considerably lower than the highest portions of the supporting planes, so that both parts overlap each other to a great extent in their region of effect. The overlapping area is made greater with the forward supporting plane or planes than with the rearward supporting planes.

In order to be able to alter the lifting force of the supporting planes according to the speed, the load or special requirements in the play of the waves, the plane may be made adjustable as to its incidence angle in a manner known per se. In many cases it is sufficient to adjust only the submerged plane portions while the plane portions near the water surface retain or change only slightly their most advantageous incidence angle. It is also possible to articulate the rearward portion of the supporting plane with the forward section of the profile fixed, a change of the profile and, consequently, also of the lifting force is effected.

In a novel manner only the forward supporting plane may be adjustable as to its incidence angle, whereby due to the change of submersion of this plane a change of the trim of the whole boat, and thus also a change of the incidence angle of the rearward fixed plane in the same sense may be produced. For example in case of an increase of the incidence angle of the forward plane, the foreship will rise and increase thereby also the incidence angle of the rearward plane.

The incidence angle may be altered by hand in the manner known per se. In a novel manner it may also be altered automatically corresponding to the speed by the dynamic pressure of the water, which is, of course, a function of the speed, and which is made to act upon a piston or another flexible device against a counterforce, for instance, a spring force. This device may be arranged directly in the water or in the hull of the boat, the water being then introduced by means of a jet. The device will transmit their movements directly to the supporting plane, or by means of an intermediary mechanism, for instance a link motion. A special device is provided, according to the invention, in the shape of a fine-regulator by means of a spring counteracting the moments issuing from the supporting plane and regulating the amount of the lifting force. The fine-regulator may be combined with the regulation by the dynamic pressure or also with the known regulations by hand.

The invention further provides another novel modification in the form of an automatic control which reduces the oscillations of the boat in the waves in such a way that in the wave valleys or troughs the partly emerging supporting plane portions adjust themselves to a greater incidence angle, whereby the loss of lifting force due to the oscillations is to a certain extent compensated.

In order to reduce the effect of shocks, the novel supporting planes may be provided with spring attachments. It is most preferable to articulate the divided supporting planes to the stays by means of hinges, and to provide them with spring and longitudinal directed pendulum action. The spring action movement will then increase towards the outside, where the most forceful shocks will be experienced. A spring attachment of any system engages the outer stay or at a greater number of stays, the said stays being guided by forced motion along the arc of a circle, the center point of which lies in the oscillating axis, if they are not attached by links on both sides.

The invention will be better understood by reference to the following detailed description in connection with the accompanying drawings, showing by way of example, some embodiments of the invention in a somewhat diagrammatic manner:

Figs. 1 to 3 are diagrammatic views transversely of the craft of forward supporting planes with attachments shown by way of example for applying them to boat bodies.

Fig. 4 is a view of an after supporting plane showing a mode of attaching it to a boat body.

Fig. 5 is a view transversely of the craft of a forward supporting plane, in which the portions rising above the water level and the portions not rising are arranged separately from one another.

Fig. 6 shows a side section in line $x$—$x$ of Figs. 1 and 4 of a portion of a supporting plane adapted to emerge from the water.

Fig. 7 illustrates a similar section but with sawlike indentures on the upper side.

Figs. 7a and 7b are sectional views, along line x—x of Figs. 1 and 4, of further modifications of a supporting plane.

Fig. 8 is the section on line z—z of Figs. 1 and 4 of a permanently submerged portion of a supporting plane.

Fig. 9 shows an intermediate or transition section on the line y—y of Figs. 1 and 4.

Figs. 10 and 11 illustrate respectively a side view and view of the bottom from below, showing a mode of attaching the supporting planes to the body of a boat, the lower half of the bottom view showing rearwardly divergent supporting plane and the mode of its attachment to the body of the boat.

Fig. 12 is a side view of the rearwardly divergent supporting plane.

Fig. 13 is a bottom view of another embodiment of the forward part of a hydroplane showing a supporting plane with rearwardly divergent ends and protective rails.

Fig. 14 is a side sectional view of an arrangement for automatically adjusting the incidence angle of the supporting planes by means of the dynamic pressure.

Fig. 15 is a side sectional view of an automatic spring control system for the supporting planes.

Fig. 16 is a schematic side sectional illustration of the arrangement for automatically controlling the incidence angle of the supporting planes for the purpose of reducing the oscillations due to the motion of the sea.

Fig. 17 illustrates in a side view the arrangement of the propeller and the disposition of the bearing.

Fig. 18 shows a side sectional view of a control device for a supporting plane operated by means of an adjusting spindle.

Fig. 19 is a side sectional view of a supporting plane with a swingable section at the rear.

In the supporting planes a shown in the illustrations, the different depths of submersion and heights of emergence have been obtained in Figs. 1, 3 and 4 by means of angle bending, and in Fig. 2 by means of both bending and curvature in a transverse direction. In order to obtain with the forward supporting planes (and, if necessary, also with the rearward supporting planes) the required large emerged supporting areas and a large vertical range of effect, and yet render it possible to connect their ends with the gliding surfaces of the body of the boat, the plane, after having attained a sufficient width of span, may be bent in the opposite direction, so as to take a direction of upward inclination towards the longitudinal axis of the boat, this bend being either in the form of an acute angle or in the form of a curve. The upwardly inclined portions thus resulting and belonging to the emerged portions, are designed, as to their profile, as described above with respect to the emerged portions and provided with an inclination of about 25 to 30° in relation to the water surface in the manner according to the invention.

In Figs. 1, 2, and 4 the supporting planes have their greatest submersion depth situated in the middle, so that the emerging controlling portions are situated at the outer sides to obtain the transverse stability. In the example shown in Fig. 3, in which two supporting planes are arranged side by side, there are also, towards the middle, emerging, i. e. controlling portions, whereas the outside emerging portions are at very great distances from another, whereby a high transverse stability of the craft is obtained.

In Fig. 5 the submerged portions of the supporting plane are placed, separately from the emerging portions of the supporting plane, at such a depth that they will always command a sufficient depth of submersion in the waves and will consequently retain a constant lifting force. In this way an improvement of action in the waves is assured. The maintenance of the proper balance of the craft is assured solely by means of the separate higher emerging portions. Both portions are inter-connected by means of the stays s.

The portions near the water surface, i. e. all those portions of the supporting planes which are temporarily immersed into the water and temporarily emerged out of the water with the oscillations of the boat and with the changes of speed, and extend in the illustrated examples from the connecting points at the gliding planes to the connecting points of the outer stays or further, possess in the Figs. 1, 3 and 4, a uniform inclination of about 25 to 30° in relation to the water level, and in Fig. 4 the measure of inclination, according to the invention, is with respect to the cross-section of the trough. In the example illustrated in Fig. 3 the inclination of the plane portions increases towards the top side, so that the plane portions in the case of lateral oscillations of the boat will submerge and emerge always at approximately the same angle. In Fig. 2 only one stay is shown, and the ends engage a fin-shaped flaring portion of the body of the boat, such as represented in Fig. 11 by a view from the bottom, and representing a continuation of the supporting plane.

The profile of the portions near the water level is shown in Figs. 6, 7 and 7a (cross-section x—x). In Fig. 6 the upperside is slightly arched similar to the arc of a circle and is of greatest height in the middle. All the known profiles similar to supporting planes of aeroplanes differ herefrom by their strongly pronounced arched form in the forward portion of the profile, which produces a heavy local under-pressure thus sucking on air very easily when approaching the surface of the water, whereby the region of underpressure is destroyed. The underside is strongly concave, so that the thickness of the profile, which should be smaller than $\frac{1}{15}$ of the depth of profile, is only that required for reasons of strength. Hereby a small angle $\epsilon$ is produced at the forward edge between upper side and arc of profile, which should be less than 20°. In dotted lines are also shown the auxiliary planes c dispositioned over the upper side, preferably adjacent to the forward edge or to the rear edge.

In Fig. 7 a profile is shown with saw-like indentures at the upper side. The angle $\epsilon$ at the forward edge is kept so small that no considerable deviation of the water stream can take place in an upward direction at the moment of immersion, and that the deviated stream will yet strike the portion of the upper side situated to the rear of the indentures. In this way the stream of water is forced to hug immediately whereas the resistance due to friction is kept at a small value owing to the restricted frictional area.

A slot in the water supporting plane of the kind shown in Fig. 7b will produce the reverse effect of a slot of the kind shown in Fig. 7a. A small step is provided in this case at the underside, in front of the slot, so that the water flowing past the slot will produce a suction effect similar to that in an injector pump in the moment where the stream separates or peels off at the upper side. The suction effect may be considerably augmented by an auxiliary plane c below the slot. In this case, the nozzle formed between the auxiliary plane and the supporting plane causes a local acceleration of the water. Suction slots of this kind may be arranged in any position and in any required number. It is also possible to provide an auxiliary plane c directly below the rear edge in order to accelerate the stream at this point and to exert a suction effect on the stream on the upperside.

With increasing depth of submersion of the supporting plane the profile gradually changes into the intermediate profile of Fig. 9 (cross-section on line y—y of Fig. 1) with straight under-side and, subsequently, into the supporting profile as per Fig. 8 (cross-section on line z—z of Fig. 1) with convex under-side. The thickness of the profile may be increased in order to decrease the number of stays, as far as this is permissible without producing cavitation phenomena.

In Fig. 4 a cross-section of the trough is shown in which a propeller is positioned in the symmetry line, and the supporting plane is bent or curved laterally to a form similar to a W, thus obtaining a sufficient submersion depth of the supporting plane combined with a small submersion depth of the propeller and a good covering of the same. The middle portion of reversed V form has good hydrodynamical qualities inasmuch as it causes a reversal or deflection of the divergent stream produced by the forward supporting plane arranged in V-form, whereby an additional rising effect is created, and the lift-drag ratio improved at the same time.

In Figs. 10 and 11 is shown an example of the method of fastening two supporting planes a and b to the bow and stern of a boat. Stepped gliding planes have been provided at the hull in this case, and the supporting planes are arranged directly below the steps. The ends of the supporting planes engage the flaring sections e of the gliding planes which have the shape of fins or of supporting planes of aeroplanes and produce a useful lifting effect thus forming a continuation of the supporting planes. The emerging portions of the planes are flaring increasingly towards the top, i. e. towards the ends, whereby not only their effect, but also the stability of the craft and their strength is increased, which is a very desirable improvement in view of the thin profiles used, possessing relatively small statical moments of resistance. A longitudinal cross-section of the trough forming behind the forward supporting plane is shown in dotted lines in Fig. 10. It will be apparent that the rear supporting plane operates in the upstream of the trough.

Figs. 1 to 4 show, that the bend or curvature of the forward supporting planes is more pronounced than that of the rear supporting planes. The vertical range of effect $v$ and $v'$ marked in Figs. 1 and 4 is of a greater area with the forward supporting plane than with the rearward supporting plane and, in the example illustrated, in the forward supporting plane comprises nearly twice the range of the rearward supporting plane, and may be made larger or smaller than the double of the rearward range corresponding to the conditions under which the boat is to run. The illustrations also show that the emerged supporting plane in the forward supporting plane is larger in relation to the submerged portion than with the rearward supporting plane, and the area of the emerged supporting plane portion of the forward supporting plane is, at travelling speed, almost as large as the immersed portion, whereas at the rearward supporting plane it is, at travelling speed, only about one third of the immersed portion. These relations will be changed, however, according to the conditions under which the boat is to run. The area of the emerged portions and the area of the immersed portions need not be proportional to their respective widths of span, but may have any relation thereto by choosing the depth of the plane accordingly.

Regarding the attachment of the supporting planes to the body of a boat, Figs. 1 to 4 show that the keel or keels of the gliding planes (or deplacing bodies) are placed considerably lower than the ends of the supporting planes at the chines or flaring portions, respectively, and that, consequently, the vertical ranges of effect $u$ and $u'$ of the gliding surfaces will considerably overlap the vertical ranges of effect $v$ and $v'$ of the supporting planes. The said overlapping is of greater extent at the forward surfaces than at the rearward surfaces and, at the forward surface amounts to about ⅓, at the rearward surface to about ¼ of the vertical range of effect of the supporting surface or plane. The overlapping will be made more or less in extent according to the conditions under which the boat is to run. Although by this mode of attaching the supporting planes, the gliding surfaces (or displacement body) will take effect in the range of waves periodically, no shocks will occur as in the known gliders. This is due to the supporting planes, which retain their lifting force in the waves always to the greater extent, so that in the wave hills only an auxiliary force will take effect at the gliding surfaces (or displacement bodies), whereas the gliding surfaces of the known gliders or gliding boats will temporarily emerge entirely and loose their lifting power so that they enter the subsequent wave with a shock.

In Figs. 11 to 13 is shown how the supporting planes are protected from floating objects. In Fig. 11 (lower half) and in Fig. 12 is shown a rearwardly divergent supporting plane, from which the floating objects will glide off towards the outside. It is evident from this illustration how the point of the surface engages the extended cutwater $d$, which is given the form of a stay approximately, whereas the ends, positioned backwards in this example, are attached to the flaring portions $e$ of the gliding surfaces, said portions being in the shape of supporting planes. Intermediate stays may be placed vertically, slanting forward or backward, or may be arranged with slanting protective rails. In front of the forward edges of the supporting planes slanting protective rails may also be provided, said rails coinciding with the slanting protective rails that may be provided in front of the stays. In Fig. 13, only the portions near the water level at the ends of the supporting plane slant backwards. In this example the supporting plane is also provided with slanting protective rails engaging the protective rails of the stays in front of the forward edge, so as to increase the arrow feature.

For the purpose of enabling adjustment of the incidence angle of the supporting planes, they are hinged to a pivot which may be placed at any position. As shown in Fig. 2, they may for instance be swung around the common axis $m$—$m$ or, in case the right hand side and the left hand side halves of the supporting plane are separated, around the two axes $n^1$—$n^1$ and $n^2$—$n^2$. In the last mentioned case the smallest moments will arise, so that with automatic control this position of the axis will be preferred. With a common axis $m$—$m$ it is necessary to compensate at least the moments by means of springs or similar devices. Instead of adjusting the incidence angle of the entire surface it is possible to swing the backward supporting plane portion, whereby a change of the profile is produced. As is shown in Fig. 13, this swinging backward supporting plane portion $a'$ may be attached to the lower points of the supporting planes and may be interrupted at the bent points.

In the control system illustrated in Fig. 14 which is operated by the dynamic pressure, the supporting plane $a$ may be swung around an axis $f$ positioned adjacent to the forward edge and is supported in the stays $s$, and its incidence angle may be altered by means of a pushing rod $g$ or another suitable transmission medium. The adjustment of the incidence angle is effected by means of the dynamic pressure of the water acting during the run on the nozzle $h$, which is connected by means of a duct $i$ with a cylinder $k$ in which a piston $l$ is movable. The water pressure on piston $l$ is counter-acted by a spring $o$. To any dynamic pressure and, therefore, to any speed there corresponds a definite length of spring and, consequently, a definite position of the piston. The said piston shifts the link-motion or slide $q$, and the sliding block $r$ moving in said link-motion transmits its movement to the supporting plane by means of a lever $t$ or a similar transmission medium.

The pitch of the link-motion curve may be made sufficiently low so that self-locking takes place, i. e. so that the planes can be adjusted by the pistons, whereas the piston in turn cannot be displaced by the action of the planes. Various means may be provided for transferring movements from the piston to the supporting planes, and particularly rotary organs, for instance excenters. Direct transmission is also possible. In the case of varying loads of the craft, a corresponding adjustment of the incidence angle must be possible, and for this purpose the tension of spring $o$, or the pitch of the link-motion may be altered, for instance by turning the cylinder or by shifting the point of application of pushing rod $g$ in lever $t$.

In Fig. 15 the automatic controlling device is shown with a spring accurately calibrated as to its power of resiliency. The supporting plane $a$ can be swung around axis $f$, said axis being positioned in front of the foremost position of the point of pressure. The resultant lifting force A, which must remain constant at all speeds, results from the moment A.$x$; $x$ being a variable value depending on the incidence angle. Operating against this moment as a balancing effect is a moment F.$z$ produced by the spring force F, in which $z$ is constant and F has a variable value for every incidence angle. The spring force F is made to change in proportion to the lever arm $x$. This result is obtained by giving to the spring suitable dimensions and by suitably positioning the axis $f$, and/or by suitably adjusting the inclination of lever $t$ and/or by using a second spring which becomes operative with the considerable increase of $x$ at small incidence angles. It is also possible, however, to change by means of roller-levers, link-motions, rod systems and similar appliances, the lever arm $z$ in proportion to the lever arm $x$, and to keep the force of the spring constant. Whereas oscillations will easily occur in this system, an oscillation damper S of known form may be used. By means of this novel spring controlling system only one constant lifting force can become effective independently from the varying speed and angle of incidence. If the lifting force increases owing to an increase of speed, the spring moment will be overcome and the incidence angle will be diminished until A is at its former value, whereas a reduction of the speed will result in an increase of the incidence angle. In case the load of the boat is changed, the tension of the spring has to be readjusted in proportion.

This control system may be combined with a hand control system or with the dynamic pressure control system described above. The spring control system is in that case arranged in the manner described, and the link-motion $q$ or similar device (excenter) is controlled by dynamic pressure or by hand. This arrangement is also illustrated by way of example in Fig. 14, where the calibrated spring is shown in dotted lines. The sliding block $r$ moves in the slide or link-motion with a certain amount of play. This play is larger with large incidence angles than with small incidence angles. The rough or preliminary control system is actuated by the dynamic pressure, whereas the spring produces a precision- or fine-adjustment to the exact lifting force. The link-motion limits the amount of oscillation of the supporting planes and prevents excessive changes of the incidence angle in case the pressure point shifts by reason of changes of the streaming or flowing conditions. If the load of the craft is changed, both systems are re-adjusted in combination, as described.

The described combined control system may also be specially modified for compensating or balancing the oscillations of the craft in the motion of the sea. This modification is also shown in Fig. 14, for a control system operated by dynamic pressure. A certain play is provided in the link motion or slide and the springs F and $o$ are dimensioned so that at normal travelling speed the sliding block $r$ lies against the lower face of the slide, so that it is made impossible for the incidence angle to decrease at increasing lifting force, for instance if the immersion of the supporting plane in a wave increases. If, however, portions of the supporting plane emerge from the wave valley, the decrease of the lifting force occasioned thereby and by the reduction of the momentum around the axis $f$ will cause the spring F to effect the increase of the incidence angle of the supporting planes and thereby substantially compensate the loss of lifting force. Also in this case oscillation dampers may be used. A control system of this type may also be used only for the forward plane in order to prevent the foreship, after an excessive loss of lifting force, being excessively submerged in the wave crests. If the automatic control system operating in the play of the waves is used with supporting planes controlled by hand, the control member $w$ actuated by hand may, as illustrated in Fig. 16 by way of example, be provided with a slot permitting an increase of the incidence angle with respect to the existing adjustment or setting. The calibrated spring F causes the incidence angle to increase with decreasing lift.

In Fig. 18 an example is shown of adjusting the incidence angle of the supporting planes by hand.

The supporting plane *a* carries an adjusting lever A serving at the same time as a protective rail for the stays, and engaging the adjusting spindle B that may consist of two elements telescoped one into the other and having counter-threads. On the spindle the wheel C is arranged, by the rotation of which the supporting plane can be swung around the axis D from any point by means of a chain, cable or similar transmission member. The plane may be provided with a rib E, serving as a covering plate or baffle for protection against the inrush of air along the plane surface.

In Fig. 19 a control system by hand is shown by way of example applied to a plane portion *a'* hinged at the rear. As in the foregoing example, the adjusting lever A again engages spindle B.

In conclusion, a propeller arranged below the supporting plane is shown in Fig. 17. The propeller *p* is positioned adjacent to the rear-edge of supporting plane *b*, so that the under-pressure area before the propeller is well covered or protected. The propeller is supported in the bearing L hinged to the rudder R. The rudder, at the same time, serves as a stay for the supporting plane *b* and carries a covering plate P for preventing sucking-in of air along this way. Below the plane *b*, a nozzle *h* has been arranged, through which the cooling water and the pressure water (for instance for controlling purposes) may enter. This arrangement has the advantage of avoiding any parts in front of the propeller, through which air may be sucked in.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claim.

I claim:

In a hydroplane, a boat hull, transversely inclined water-supporting planes arranged in tandem order below and spaced from the hull, said planes including lower portions adapted to be permanently submerged in the water, upper portions adapted to be normally emerged from the water, and intermediate portions adapted to be near the water level during travel of the hydroplane, at least a part of the said water-supporting planes being W-shaped as viewed from the direction of movement of the hydroplane.

HANNS FREIHERR SCHERTEL
VON BURTENBACH.